United States Patent [19]
Davidian et al.

[11] Patent Number: 5,710,767
[45] Date of Patent: Jan. 20, 1998

[54] AUTOMATIC DATA BYPASS OF A REMOVED/FAILED CDMA CHANNEL UNIT

[75] Inventors: Winston Davidian, Millburn, N.J.; Kenneth Yiu-Kwong Ho, Syosset, N.Y.; Kenneth W. Parker, Rockaway, N.J.

[73] Assignee: Lucent Technologies Inc., Murray Hill, N.J.

[21] Appl. No.: 603,770

[22] Filed: Feb. 20, 1996

[51] Int. Cl.⁶ .................................................. H04J 13/00
[52] U.S. Cl. .......................... 370/335; 370/441; 375/205
[58] Field of Search ................................. 370/319, 312, 370/314, 320, 321, 324, 326, 329, 335, 336, 337, 342, 343, 347, 350; 455/38.1, 51.1; 375/200, 205

[56] References Cited

U.S. PATENT DOCUMENTS 5,544,164  8/1996  Baran ........................................ 370/397

*Primary Examiner*—Dang Ton

[57] ABSTRACT

Disclosed is an apparatus for encoding a plurality of data streams in a code division multiple access format to produce a composite signal. The apparatus comprises a plurality of channel units coupled in series, where each channel unit encodes at least one of the plurality of data streams. Each channel unit also combines the data encoded therein with a preceding encoded output signal provided by a preceding one of the channel units to thereby produce an associated encoded output signal. At least one channel unit is capable of providing the associated encoded output signal as a direct output signal to a first subsequent channel unit, and of providing a bypass output signal having cumulative encoded data to a further subsequent channel unit to effect a bypass of the first subsequent channel unit.

24 Claims, 9 Drawing Sheets

AUTOMATIC DATA BYPASS OF A REMOVED/FAILED CDMA CHANNEL UNIT

FIELD OF THE INVENTION

The present invention relates generally to code division multiple access (CDMA) wireless telecommunications, and more particularly, to automatic data bypass of a failed or removed code division multiple access channel unit.

BACKGROUND OF THE INVENTION

In wireless telecommunication systems employing code division multiple access, each user is assigned a different coding scheme to code individual data bits to be transmitted, such as the data bits of digitized voice signals. These coding schemes are orthogonal or partially correlated to each other, such that it is possible to identify the user based on an analysis of the codes used in the transmission. Consequently, more than one user can communicate on the same frequency channel.

FIG. 1 schematically illustrates base station transmitter electronics of a prior art code division multiple access system. Input information-bearing signals such as analog voice of a plurality of communication sessions are received from the telephone network by controller 110. The input signals are converted by controller 110 to baseband data streams $d_1$–$d_N$, each of which contain data bits of one or more of the input signals. Code division multiple access channel units $102_1$–$102_N$, coupled in series, each include an associated code division multiple access chip encoder $104_1$–$104_N$, which encodes the corresponding data stream $d_1$–$d_N$ and supplies an encoded output to a corresponding digital combiner $106_1$–$106_N$. Each combiner $106_i$ adds the encoded signal from the associated chip encoder with an output encoded signal $cd_{i-1}$ from the previous channel unit $102_{i-1}$. Thus, the digital combiners add the encoded signals progressively. Hence, encoded signal $cd_1$ includes only data stream $d_1$ (encoded), while encoded signal $cd_N$ includes all data streams $d_1$–$d_N$ (encoded).

Accordingly, the circuit arrangement of FIG. 1 can be referred to as a "daisy-chain" arrangement. Each channel unit $102_i$ has a fixed, predetermined delay so that all the encoded data is substantially synchronized when combined to form composite signal $cd_N$. The composite signal $cd_N$ is then applied to analog conversion unit (ACU) 130, to CDMA radio 140 and antenna AT, where it is transmitted to a plurality of wireless communication terminals, e.g., cellular telephones.

A drawback of the above-described daisy-chain arrangement is that if one of channel units $102_1$–$102_N$ should fail, all the encoded data from the previous units would be lost. For example, if unit $102_3$ fails, the data from units $102_1$–$102_2$ will be lost.

Moreover, it would be desirable to have the capability or removing any of the units $102_i$ for maintenance or otherwise without losing encoded data from the other units.

Accordingly, there exists a need for a system without this "single point of failure" deficiency, which can maintain synchronization of the data within output composite signal $cd_N$ when one or more of the channel units either fail or are removed.

SUMMARY OF THE INVENTION

In an illustrative embodiment of the present invention, disclosed is an apparatus for encoding a plurality of data streams in a code division multiple access format to produce a composite signal. The apparatus comprises a plurality of channel units coupled in series, where each channel unit encodes at least one of the plurality of data streams. Each channel unit also combines the data encoded therein with a preceding encoded output signal provided by a preceding one of the channel units to thereby produce an associated encoded output signal. At least one channel unit is capable of providing the associated encoded output signal as a direct output signal to a first subsequent channel unit, and of providing a bypass output signal having cumulative encoded data to a further subsequent channel unit in order to bypass the first subsequent channel unit, such as when it is malfunctioning or electrically disconnected.

BRIEF DESCRIPTION OF THE DRAWINGS

For a better understanding of the present invention, reference is had to exemplary embodiments thereof, considered in conjunction with the accompanying drawings in which like reference numerals depict similar or identical elements, wherein.

DETAILED DESCRIPTION OF THE PREFERRED EMBODIMENTS

For purposes of illustration, exemplary embodiments of the invention will be presented below as forming a portion of a base station transmitter in a wireless telecommunication system. It is understood, however, that these embodiments are presented for illustrative purposes only, and that the invention may also be implemented in other systems, such as in time division multiple access (TDMA) systems.

Figure 2:
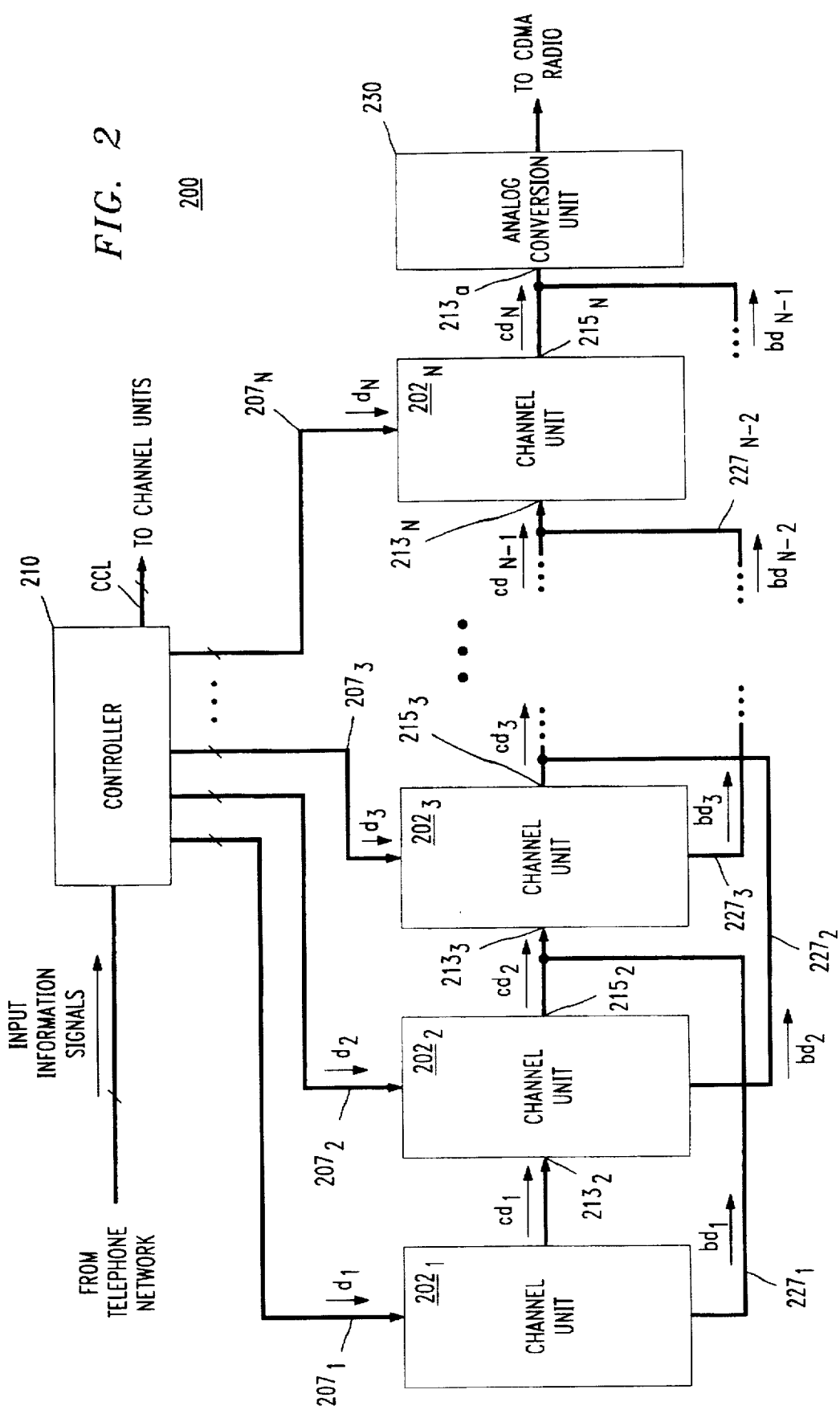
FIG. 2 is a block diagram of code division multiple access transmitter electronics in accordance with the present invention.

FIG. 2 is a block diagram of a first embodiment of code division multiple access transmitter electronics in accordance with the present invention, designated generally as 200. Input information-bearing signals from the telephone network are received by controller 210 and converted to digital data streams $d_1$–$d_N$ on respective lines $207_1$–$207_N$. Each data stream $d_i$ typically includes a plurality of information-bearing signals of different communication sessions. Data streams $d_1$–$d_N$ are applied to channel units $202_1$–$202_N$, respectively, where the individual data bits of the data streams are encoded in a code division multiple access format. The channel units are typically integrated circuit cards that can be easily removed from the system for maintenance or replacement. Channel units $202_1$–$202_N$ comprise a channel unit "cluster". Additional clusters can be also provided, each of which supplies a composite encoded output signal as $cd_N$ to analog conversion unit 230.

Figure 1:
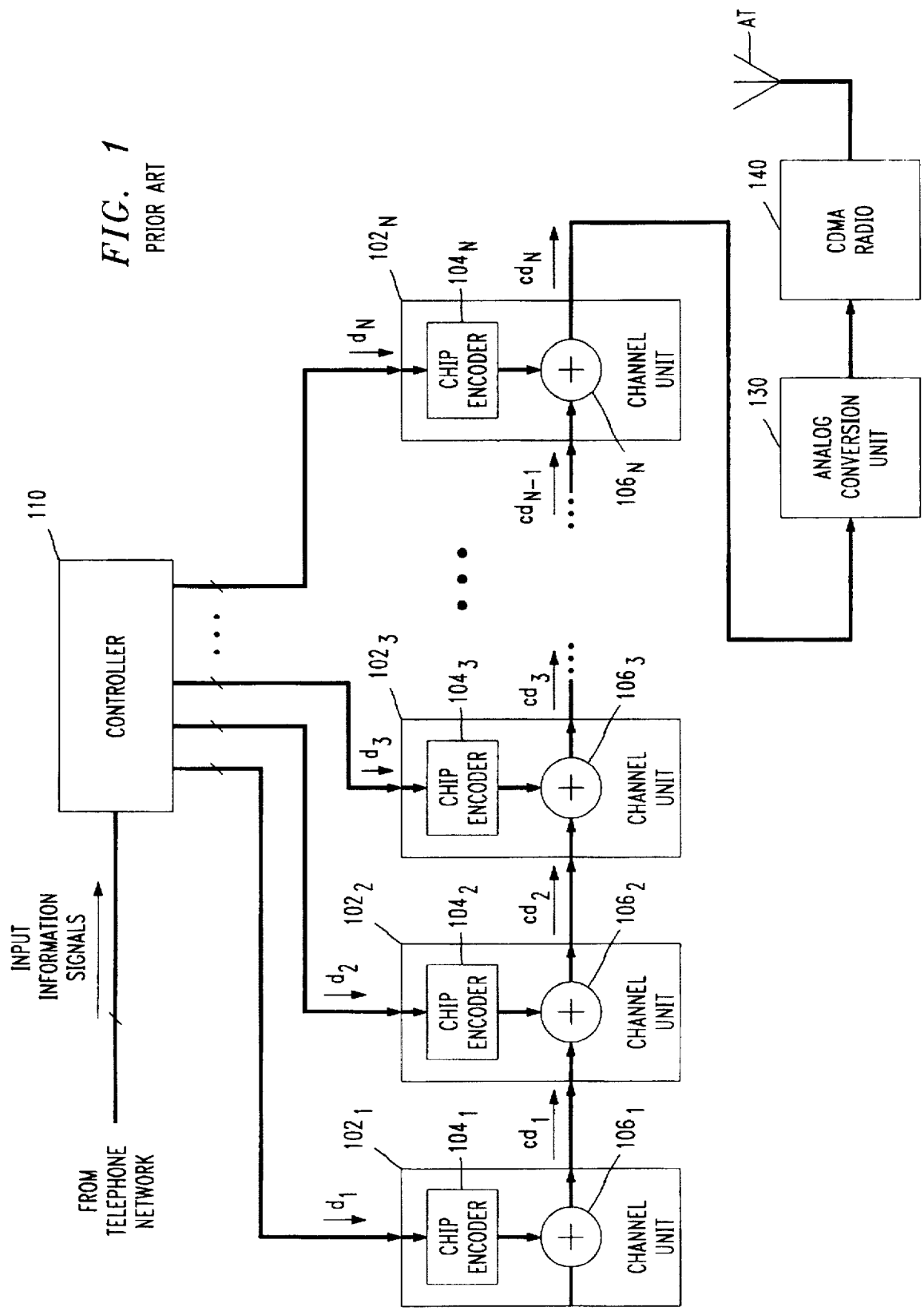
FIG. 1 is a block diagram of prior art code division multiple access transmitter electronics.

In this embodiment, each channel unit $202_i$ can provide a direct output signal $cd_i$ on output port $215_i$ and a bypass output signal $bd_i$ on bypass line $227_i$. Direct output signal $c_i$ is an encoded data signal similar to signals $cd_1$–$cd_N$ of the prior art system of FIG. 1. Thus, if all channel units $202_1$–$202_N$ are operating properly, signal $cd_1$ will contain encoded data of data streams $d_1$, signal $cd_N$ will contain encoded data of data streams $d_1$–$d_N$, and so on. In this scenario, no bypass signals $bd_1 bd_N$ will be provided. It is noted that at any given time during system operation, some of the communication channels may not be used. In this case, one or more of the channel units may have no incident data stream $d_i$ applied. At such time, each of these channel units will not encode any data, but will just operate to pass the cumulative encoded data applied to its input port $213_i$ to the next functional channel unit.

When any channel unit $202_i$ is either malfunctioning, becomes electrically disconnected, or is to be physically removed for maintenance or otherwise, the immediately preceding channel unit $202_{i-1}$ in the chain is apprised of this condition (e.g., by a command from another channel unit or from controller 210) and responds by providing bypass signal $bd_{i-1}$ to the subsequent adjacent channel unit $202_{i+1}$. Concurrently, a command originating either from channel unit $202_{i+1}$ or from controller 210 is sent to channel unit $202_i$, causing direct output signal $cd_i$ to be suspended. Bypass output signals $bd_1$–$bd_{N-2}$ are time delayed versions of direct output signals $cd_1$–$cd_{N-2}$, respectively. Each time delay corresponds to the delay that each channel unit normally incurs from input port $213_i$ to output port $215_i$. Bypass signal $bd_{i-1}$ is provided via bypass line $227_{i-1}$ to input port $213_{i+1}$ of channel unit $202_{i+1}$, since bypass line $227_{i-1}$ connects to a common bus line also used for signal $cd_i$ (when not suspended). Hence, the encoded output data from unit $202_{i-1}$ bypasses the malfunctioning or removed channel unit $202_i$, whereby encoded data from the channel units preceding the malfunctioning channel unit are not lost. Synchronization of the encoded data is maintained by virtue of the time delays incorporated within the bypass signals. Clock pulses and control signals are provided by controller 210 on lines CCL to each channel unit $202_1$–$202_N$ to facilitate the synchronization of the data.

Analog conversion unit 230 receives, at input port $213_a$, either direct signal $cd_N$ from the last channel trait $202_N$ in the chain or bypass signal $bd_{N-1}$ from the next to last channel unit $202_{N-1}$ (not shown). ACU 230 converts the encoded data applied thereto to analog form and supplies an analog output to a CDMA radio for subsequent wireless transmission to wireless communication terminals.

Figure 3:
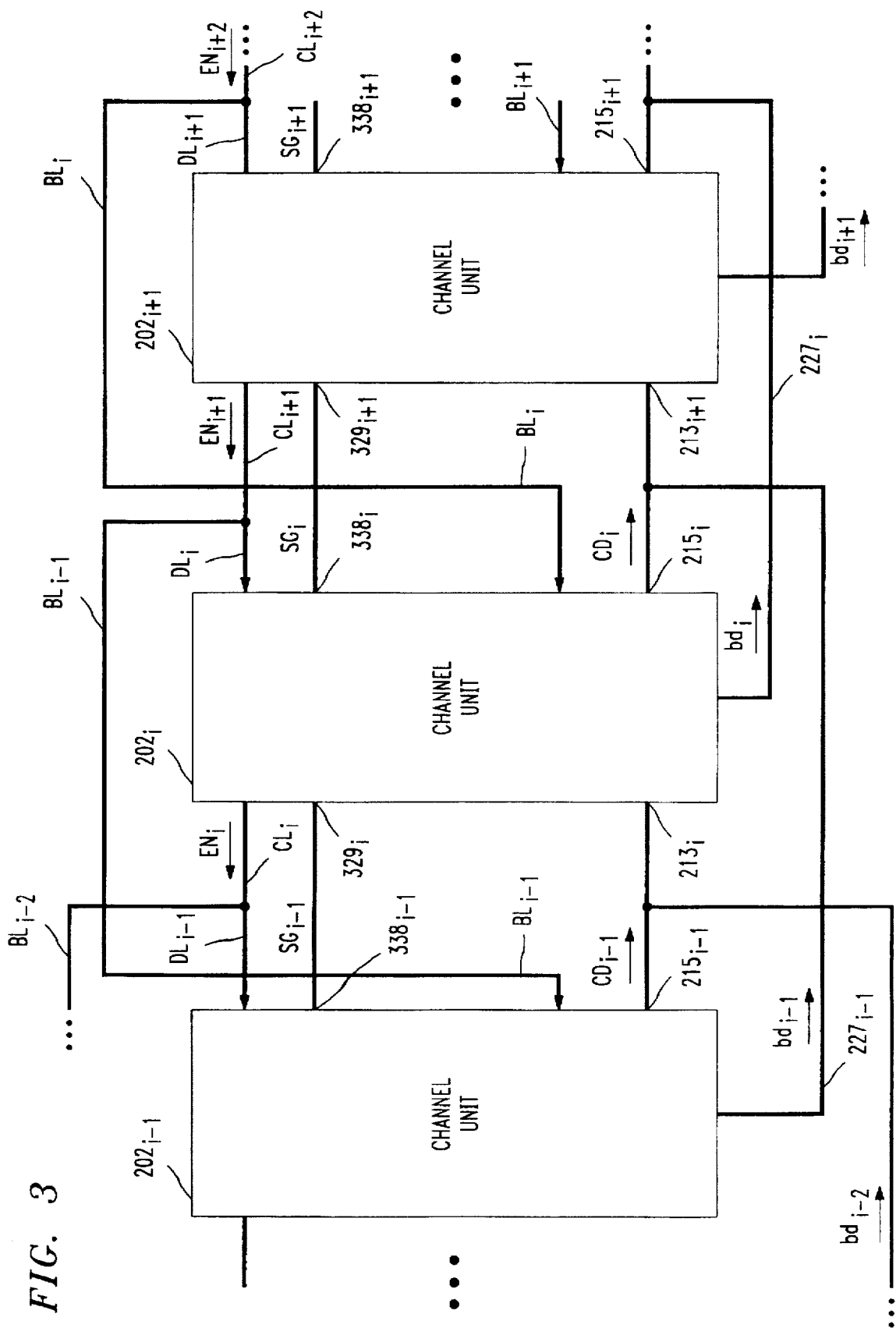
FIG. 3 illustrates exemplary control signal flow between channel units.

FIG. 3 illustrates three consecutive channel units $202_{i-1}$, $202_i$ and $202_{i+1}$ and a preferred control signal arrangement to effect bypass of a selected channel unit. Each channel unit such as $202_i$ provides a control signal $EN_i$ on associated control line $CL_i$. Control line $CL_i$ is split into control line $DL_{i-1}$ supplied to channel unit $202_{i-1}$ and control line $BL_{i-2}$ supplied to channel unit $202_{i-2}$, where each of these control lines carry the $EN_i$ signal. The logic state of control signal $EN_i$ will determine whether a bypass is implemented.

By way of example, when the three channel units of FIG. 3 are functioning properly, channel unit $202_{i+1}$ supplies signal $EN_{i+1}$ on line $DL_i$ at a first logic state causing signal $cd_i$ to be outputted. Signal $EN_{i+1}$ is also provided on line $BL_{i-1}$ at the same logic state, which disables the outputting of bypass signal $bd_{i-1}$. Hence, the signal applied to channel unit $202_{i+1}$ on port $213_{i+1}$ is $cd_i$ in this case. If, however, channel unit $202_i$ is providing defective data or otherwise malfunctioning, this condition is detected by channel unit $202_{i+1}$, which responds by changing the logic state of control signal $EN_{i+1}$ to a second logic state. This results in suspending direct output signal $cd_i$ and causing bypass signal $bd_{i-1}$ to be outputted. Only bypass signal $bd_{i-1}$ is thereby applied to port $213_{i+1}$ in this scenario, and the encoded data from the channel units preceding channel unit $202_i$ are not lost. Since control lines $DL_i$ and $BL_{-1}$ are derived from a common control line, either signal $cd_i$ or $bd_{i-1}$, but not both, will appear at port $213_{i+1}$ at any given time.

Each channel unit such as $202_i$ also supplies a ground potential $SG_i$ on port $338_i$, which is coupled to port $329_{i+1}$ of the subsequent channel unit $202_{i+1}$. When channel unit $202_i$ is removed for maintenance or otherwise, the connection between these ports is broken, forcing signal $EN_i$ to the second logic state, whereby channel unit $202_i$ is bypassed.

Optionally, controller 210 can provide, via lines CCL, (see FIG. 2) additional control signals to those generated by the neighboring channel units to effect bypassing of defective or removed channel units. In the alternative, each channel unit would report defects in data received from the previous neighbor and only controller 210 would provide the control signals to implement a bypass.

Figure 4:
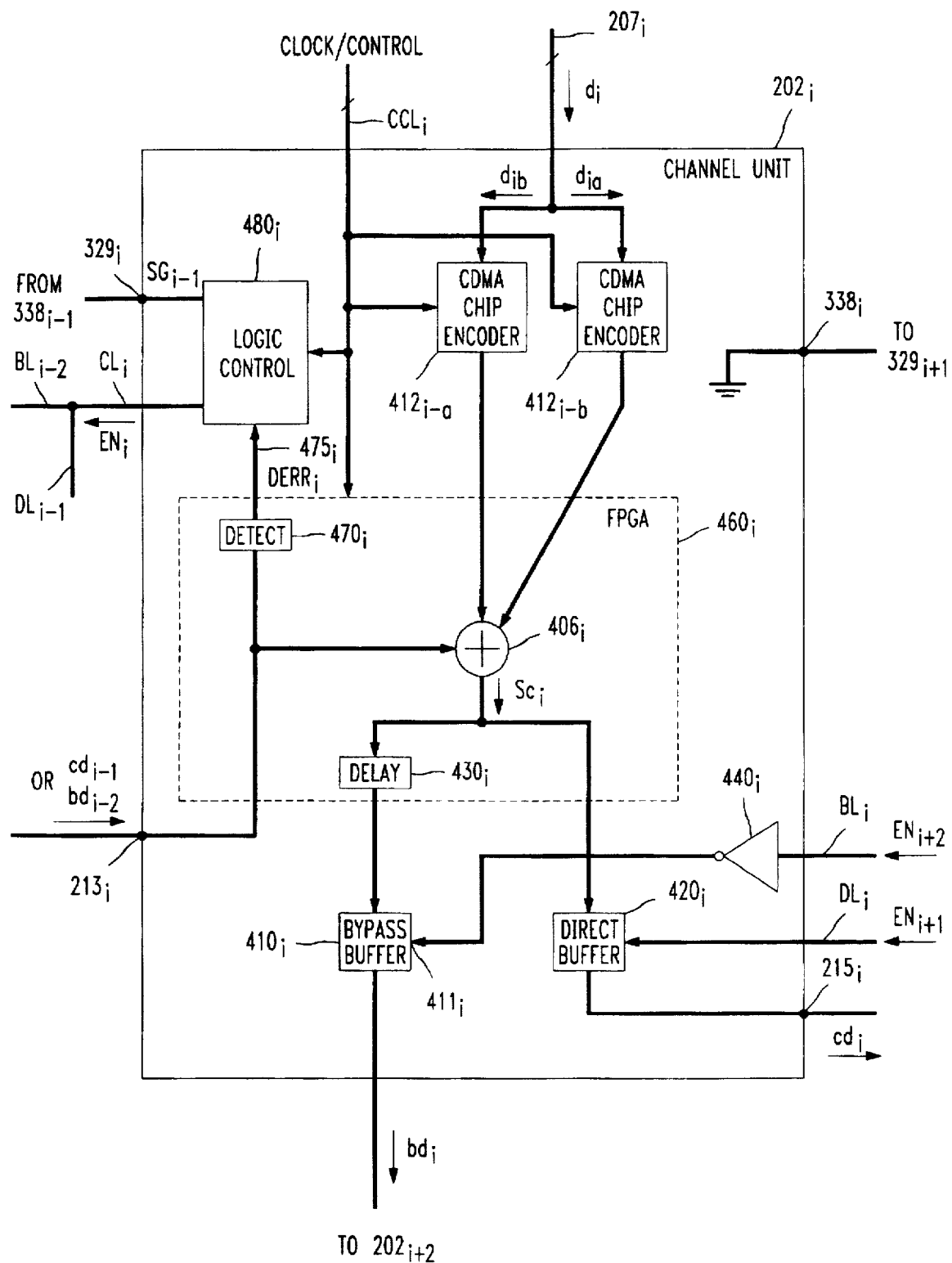
FIG. 4 is a schematic block diagram of an illustrative channel unit in accordance with the present invention.

Referring to FIG. 4, a block diagram of an exemplary channel unit $202_i$ is shown. In this example, input data streams $d_i$ are comprised of a pair of data streams $d_{ia}$ and $d_{ib}$, each carrying data of a separate communication session. Channel unit $202_i$ employs a pair of code division multiple access chip encoders $412_i$-$a$ and $412_i$-$b$ to encode the respective data streams $d_{ia}$ and $d_{ib}$. In the general case, the number of chip encoders employed within each channel unit corresponds to the number of input data streams to be encoded by that channel unit which is two in the current example. Code division multiple access chip encoders are known in the art and are available commercially as Application Specific Integrated Circuits (ASICs) from QUALCOMM Corporation located in San Diego, Calif., and from other manufacturers. Each chip encoder $412_i$-$a$ and $412_i$-$b$ is programmed to compensate for cumulative delays of data through the channel units during normal operation (with or without bypass signals being selected), thereby enabling synchronization of the encoded data outputs of each channel unit $202_i$. Clock pulses are supplied to the chip encoders on lines $CCL_i$ to provide a common time reference and facilitate synchronization.

Figure 5:
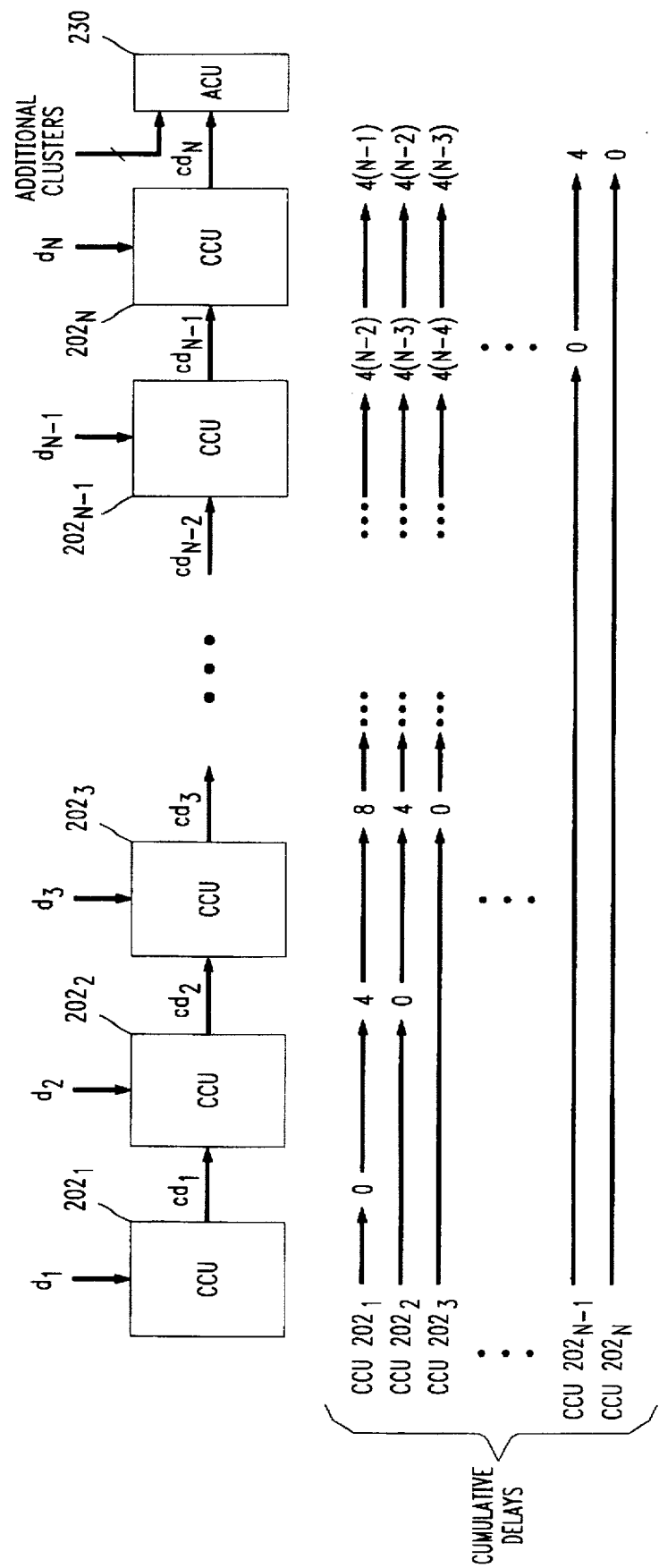
FIG. 5 illustrates exemplary cumulative data delays in channel units.

FIG. 5 illustrates cumulative delays through code division multiple access channel units (CCU) $202_1$–$202_N$ that are compensated for by the programming of chip encoders 412. Each CCU is assumed in this example to delay the encoded input data from the preceding CCU by four clock cycles. As such, the encoded data streams $d_1$ of signal $cd_1$ are delayed within CCU $202_2$ by four clock cycles and by another four clock cycles within CCU $202_3$, and so forth. After being combined to form composite signal $cd_N$, the data streams $cd_1$ will have been delayed by $4 \times (N-1)$ clock cycles. At the other extreme, the data streams $d_N$ encoded by CCU $202_N$ do not incur any delay after being combined with data streams $cd_{N-1}$ to form composite signal $cd_N$. As such, chip encoders $412_N$-$a$ and $412_N$-$b$ within CCU $202_N$ are programmed to delay the input data stream $d_N$ by $4 \times (N-1)$ clock cycles; chip encoders $412_1$-$a$ and $412_1$-$b$ are programmed to delay the input data streams $d_1$ by zero clock cycles, and so on, such that all encoded data is combined in synchronism to form composite signal $cd_N$. Additional delays are incurred when bypass paths are selected in order to maintain data synchronization, as will be described below.

With continuing reference to FIG. 4, digital combiner $406_i$ is coupled to each chip encoder and to input port $213_i$, and receives the encoded data streams from the chip encoders and encoded data stream $cd_{i-1}$ or $bd_{i-2}$ incident upon input port $213_i$. Digital combiners are known in the art and can be incorporated within a field programmable gate array (FPGA), here FPGA $460_i$. Digital combiner $406_i$ combines the encoded data streams it receives to form a composite output signal $S_{Ci}$. This signal is routed in either a bypass path defined by delay element $430_i$ and bypass buffer $410_i$ to produce bypass signal $bd_i$, or in a direct path encompassing direct buffer $420_i$ to produce direct output signal $cd_i$. Direct buffer $420_i$ can be a tristate logic buffer controlled (i.e., "enabled") by signal $EN_{i+1}$ originating from neighboring channel unit $202_{i+1}$. Bypass buffer $410_i$ can also be a tristate buffer, enabled by control signal $EN_{i+2}$ originating from channel unit $202_{i+2}$ and inverted by invertor $440_i$.

As explained above in reference to FIG. 3, when channel unit $202_i$ is functioning properly, the subsequent channel unit $202_{i+1}$ provides signal $EN_{i+1}$ at a first logic state, e.g., LOW, thereby allowing data to pass through direct buffer $420_i$ such that signal $cd_i$ is outputted. Concomitantly, bypass buffer $410_{i-1}$ (not shown) of the preceding channel unit $202_{i-1}$ is disabled, thus suspending bypass signal $bd_{i-1}$ so that only signal $cd_i$ is applied to channel unit $202_{i+1}$. When channel unit $220_i$ is malfunctioning or electrically disconnected, $EN_{i+1}$ is HIGH and the opposite occurs. When channel unit $220_{i+1}$ is malfunctioning or disconnected, control signal $EN_{i+2}$ supplied from channel unit $202_{i+2}$ is HIGH, causing bypass buffer $410_i$ to output bypass signal $bd_i$, which is supplied to channel unit $202_{i+2}$.

In the bypass path, the delay introduced by delay element $430_i$ is equivalent to the delay normally incurred from input port $213_i$ through digital combiner $406_i$ to direct output port $215_i$, excluding the delay through direct buffer $420_i$. Delay element $430_i$ receives clock pulses and control bits from controller 210 via lines $CCL_i$ to insure that the proper delay is introduced, e.g., a predetermined number of clock pulses. Accordingly, when the bypass path is selected, the output data can arrive at channel unit $202_{i+2}$ with the same phase as in the normal operation case—i.e., the phase of the direct output signal $cd_i$ as delayed through channel unit $202_{i+1}$. Thus, synchronism of the data is maintained. For instance, in the example presented in FIG. 5 where each channel unit normally incurs a four clock cycle delay, the delay introduced by delay element $430_i$ would be four clock cycles.

The data stream input on port $213_i$ from the previous neighbor $202_{i-1}$, i.e., direct signal $cd_{i-1}$ or bypass signal $bd_{i-2}$, is sampled by detection circuit $470_i$, also included within FPGA $460_i$. When detection circuit $470_i$ detects properly formatted data within the input data stream, e.g., by detecting correct parity bits, it provides signal $D_{ERRi}$ on line $475_i$ at a first logic state, e.g., HIGH. When faulty data is detected, such as when there is a parity bit error, signal $D_{ERRi}$ is provided at the opposite logic state, e.g., LOW. Logic control circuit $480_i$ receives signal $D_{ERRi}$ and provides signal $EN_i$ as HIGH if signal $D_{ERRi}$ is indicative of faulty data. Logic control circuit will also provide signal $EN_i$ as HIGH if voltage potential $SG_{i-1}$ indicates that the ground connection between port $329_i$ and port $338_i$ is broken. Signal $EN_i$ will also be HIGH if the logic control circuit receives a specific command from controller 210 on one of lines $CCL_i$.

Figure 6:
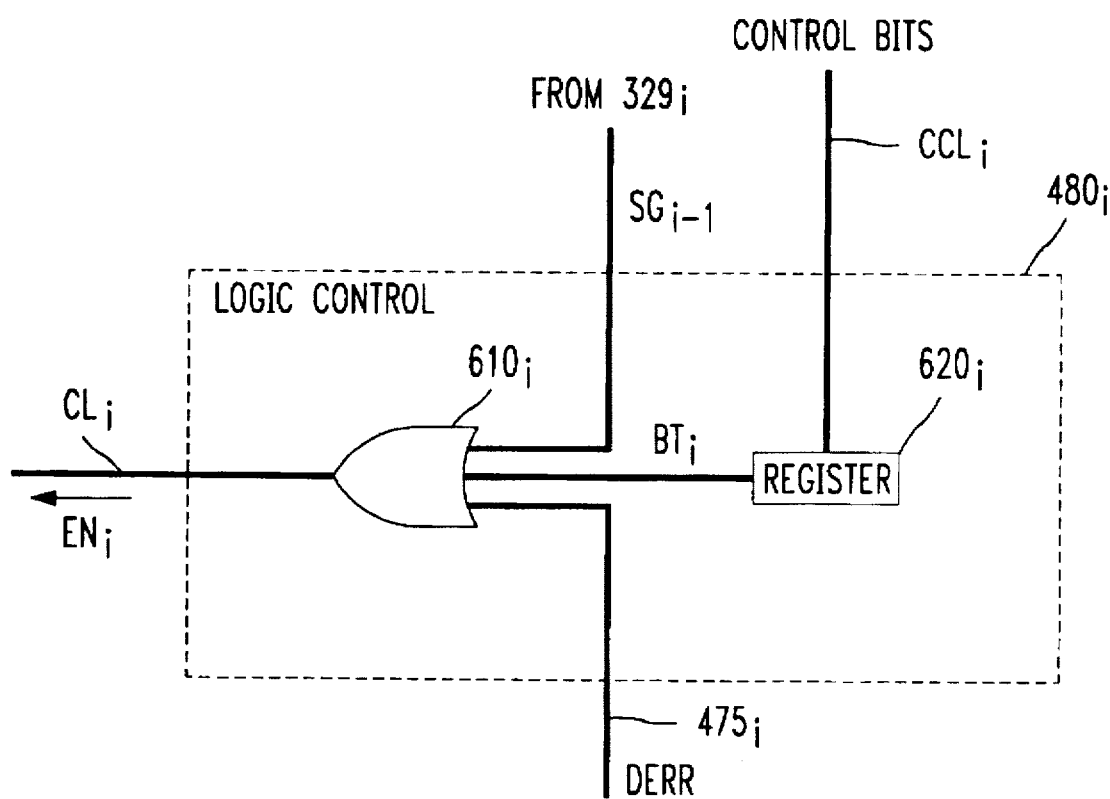
FIG. 6 is a schematic diagram of an illustrative logic control circuit.

FIG. 6 is a schematic diagram of an exemplary logic control circuit $480_i$ which can be utilized within an associated channel unit $202_i$. If any of three input logic signals $D_{ERRi}$, $BT_i$ or $SG_{i-1}$ applied to OR gate $610_i$ are HIGH, then output signal $EN_i$ is HIGH, thereby effecting a bypass of the previous channel unit $202_{i-1}$. Logic signal $BT_i$ is provided by register $620_i$, and is HIGH if control bits on line $CCL_i$ originating from controller 210 indicate that a bypass of the previous channel unit $202_{i-1}$ should be implemented. For instance, an operator wishing to perform maintenance on the previous channel unit $202_{i-1}$ can enter a specific command on controller 210 to cause that channel unit to be bypassed prior to the operator physically removing it. During normal operation, logic signal $SG_{i-1}$ is pulled LOW by the ground connection in unit $202_{i-1}$ but floats HIGH if the ground connection is broken. Signal $D_{ERRi}$ is HIGH when faulty data is detected, as discussed above.

Figure 7:
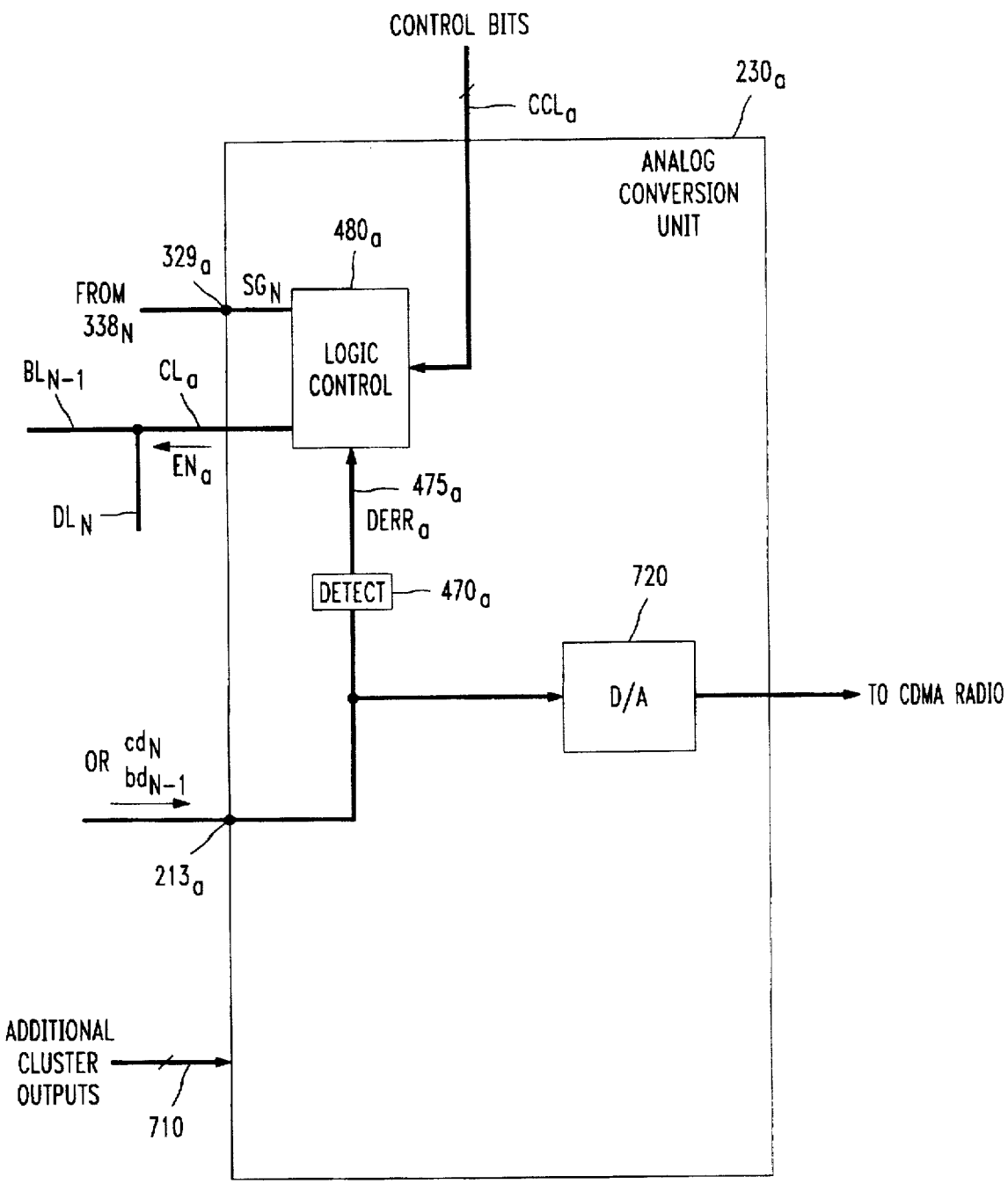
FIG. 7 is a block diagram of an exemplary analog conversion unit.

FIG. 7 shows a block diagram of an exemplary analog conversion unit (ACU) $230a$. Encoded output signal $cd_N$ from channel unit $202_N$ or bypass output signal $bd_{N-1}$ from channel unit $202_{N-1}$ is applied to input port $213_a$. Detection circuit $470_a$ detects whether data within signal $cd_N$ is faulty and outputs logic signal $D_{ERRa}$ on line $475_a$ indicative of this determination. Logic control circuit $480_a$ provides control signal $EN_a$ at a logic level responsive to signals $D_{ERRa}$ and $SG_N$ from channel unit $202_N$ and also to control bits from the controller 210 on lines $CCL_a$. Thus, when any of these signals indicate that a bypass of the last channel unit $202_N$ should be implemented, signal $EN_a$ is provided as a logic HIGH, which causes the corresponding buffers within channel units $202_N$ and $202_{N-1}$ to effect a bypass. The resulting encoded input signal to the ACU—i.e., signal $cd_N$ or $bd_{N-1}$—is applied to D/A converter 720 where it is converted to analog form and outputted to the CDMA radio. Optionally, additional encoded input signals from other clusters are applied to ACU $230_a$ on bus lines 710. These encoded signals are converted to analog as well, and then outputted. The additional encoded signals can also be detected for faulty data by employing a detection circuit $470_i$ and logic control circuit $480_i$ for each cluster input. Each logic control circuit would then supply the last and next to last channel units of the associated cluster with a control signal $EN_i$ to control bypass of the last channel unit in that cluster.

Figure 8:
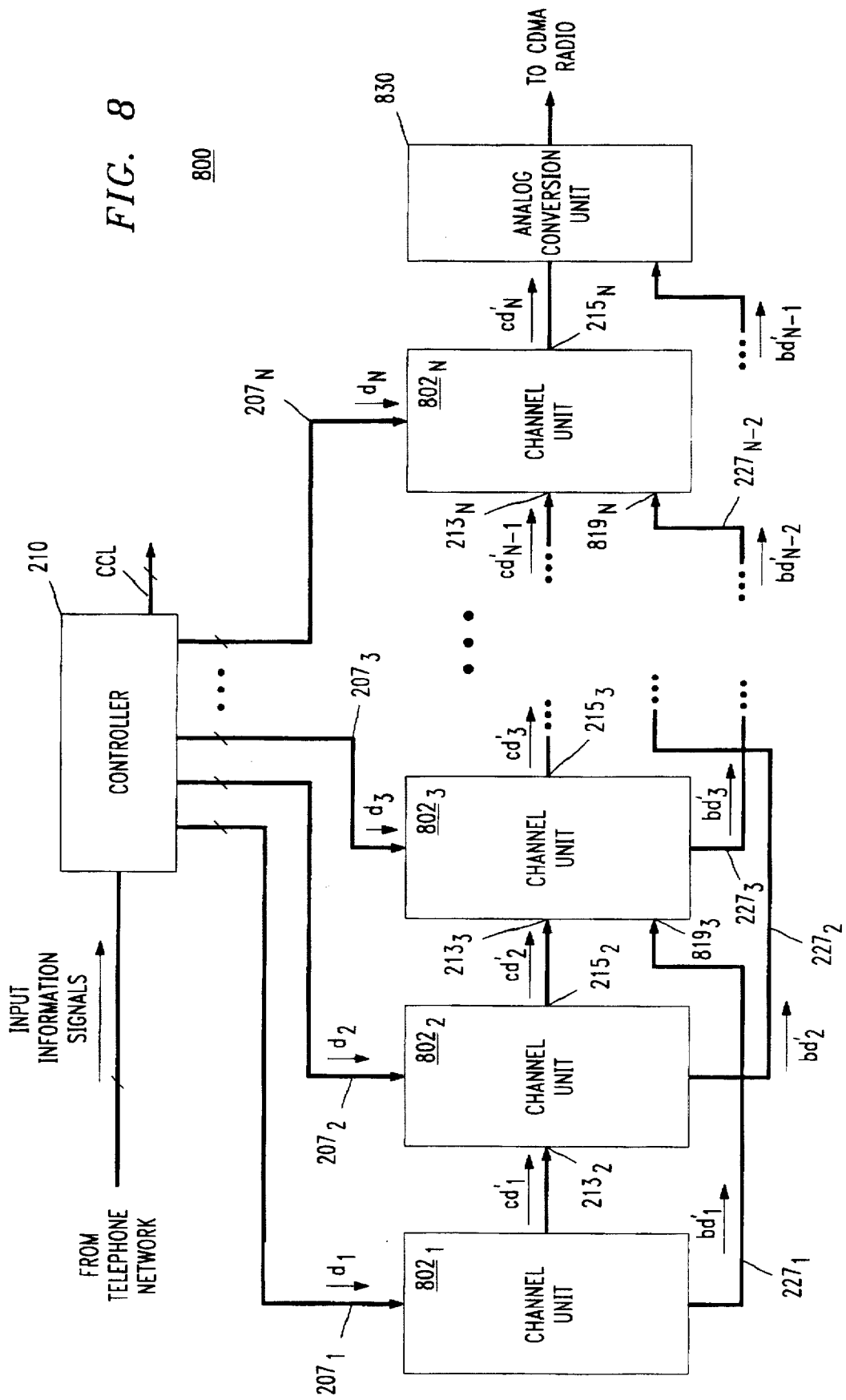
FIG. 8 is a block diagram of an alternative embodiment of the present invention; and, FIG. 9 illustrates a block diagram of an alternative exemplary channel unit.

FIG. 8 schematically illustrates an alternate embodiment of code division multiple access transmitter electronics in accordance with the present invention, designated generally as 800. Controller 210 provides data streams $d_1$–$d_N$ on respective lines $207_1$–$207_N$ as in the embodiment of FIG. 1. Code division multiple access channel units $802_1$–$802_{N-1}$ differ from the above described channel units in that each channel unit $802_i$ always provides, when functioning properly, both a direct encoded output signal $cd_i'$ and a bypass encoded output signal $bd_i'$ simultaneously, each having cumulative encoded data. The cumulative encoded data includes data encoded in that channel unit $802_i$ containing data stream $d_i$ (encoded) combined with data encoded in the preceding channel units $802_1$–$802_{i-1}$ when each channel unit is operational. Each bypass output signal $bd_i'$ is substantially the same as the direct output signal $cd_i'$ except delayed by a predetermined delay, corresponding to the delay of encoded data through a channel unit, in order to maintain synchronization of the cumulative encoded data. Each channel unit $802_i$ (excluding channel units $802_1$ and $802_2$) receives signals $cd_{i-1}$ and $bd_{i-2}$ on respective input ports $213_i$ and $819_i$ and selects which encoded output signal—whether $cd_{i-1}$ or $bd_{i-2}$—is to be combined with the encoded data stream $d_i$ within that unit. Encoded data signals $cd_N'$ and $bd_{N-1}'$ are applied to analog conversion unit 830, which analogously selects which of these signals is to be converted to analog form and outputted to the CDMA radio.

Figure 9:
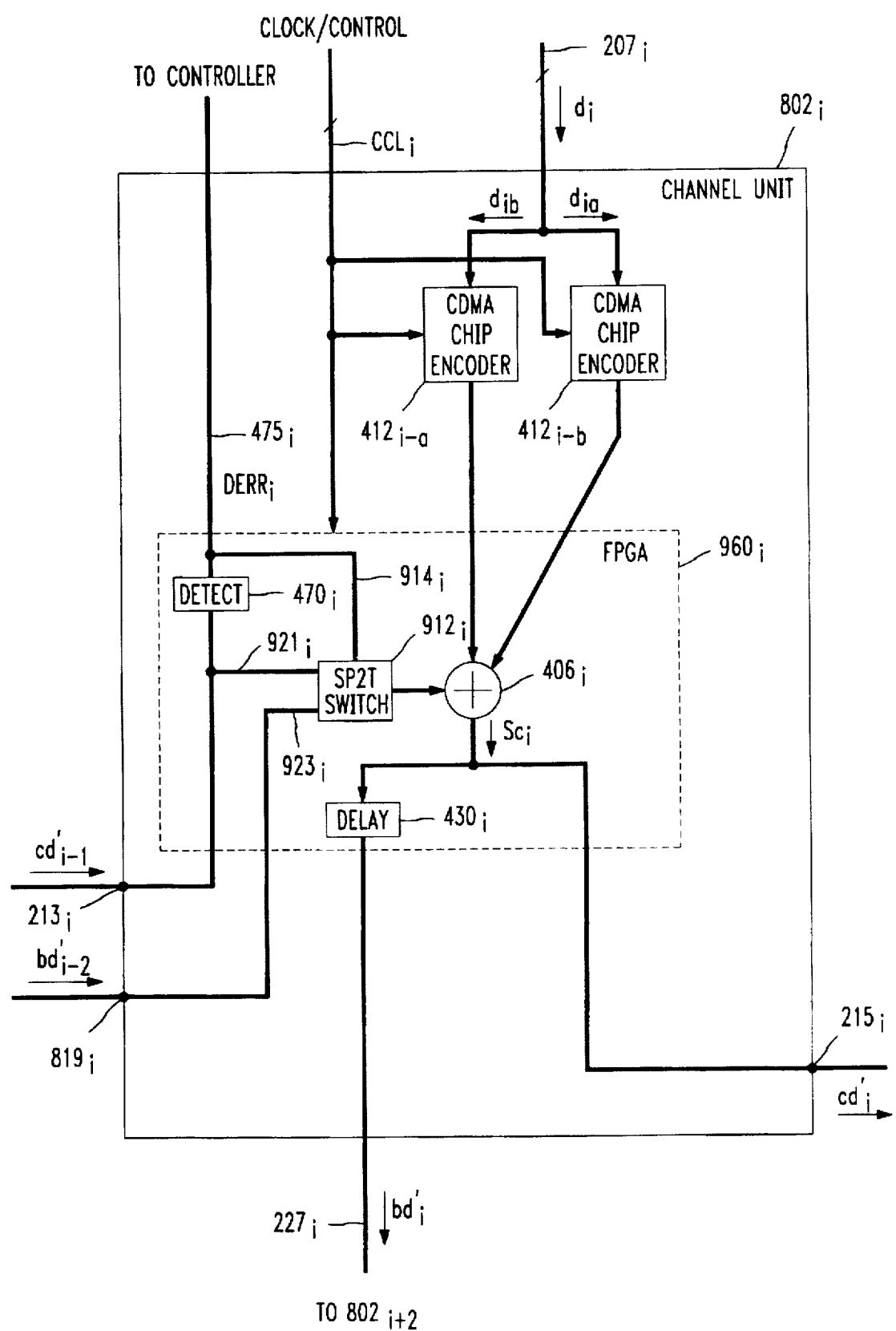

FIG. 9 is a block diagram of an exemplary channel unit $802_i$, which can be used for any of channel units $802_1$–$802_N$. Encoded input signal $cd_{i-1}'$ is received at port $213_i$ and applied to both detection circuit $470_i$ and to an input port of single pole two throw (SP2T) switch $912_i$ via line $921_i$. Detection circuit $470_i$ provides logic level output signal $D_{ERRi}$ on line $475_i$ as described above, which is HIGH when faulty data is detected. In this embodiment, signal $D_{ERRi}$ is applied via line $914_i$ to a control port of switch $912_i$ to control its switch position. Bypass input signal $bd_{i-2}'$ is applied to input port $819_i$ and routed to the other switch input port of switch $912_i$ via line $923_i$. Hence, when signal $D_{ERRi}$ is HIGH, bypass input signal $bd_{i-2}'$ is switched to digital combiner $406_i$; when $D_{ERRi}$ is LOW indicating proper data without faults, then direct signal $cd_{i-1}'$ is switched to the digital combiner. Signal $D_{ERRi}$ is also provided to the controller to apprise it of data faults detected. Combined signal $Sc_i$ is outputted by digital combiner $406_i$, delayed by delay circuit $430_i$ in the bypass path to produce bypass signal $bd_i'$. Signal $Sc_i$ is directly outputted in the direct path to produce signal $cd_i'$. The delay circuit, detection circuit, SP2T switch and digital combiner are typically incorporated within a field programmable gate array, here FPGA $960_i$. It is noted that while the buffers have been removed in the output paths, they can optionally be included to suspend the encoded output signals responsive to commands from controller 210 or from other channel units. Switch $912_i$ can also be modified to be responsive to commands from controller 210 and/or from other channel units.

It will be understood that the embodiments disclosed herein are merely exemplary and that one skilled in the art can make many modifications and variations to the disclosed embodiments without departing from the spirit and scope of the invention. For example, while the above embodiments have been disclosed as having bypass lines that each bypass a single channel unit, it is understood that analogous embodiments can be constructed having the capability of bypassing two or more consecutive channel units. Moreover, while the disclosed embodiments have described in relation to a code division multiple access system, the invention may also be applicable to TDMA systems. Accordingly, all such modifications and variations are intended to be included within the scope of the invention.

What is claimed is:

1. An apparatus for encoding a plurality of data streams in a code division multiple access format, comprising:
    a plurality of channel units coupled in series, each for encoding at least one of said plurality of data streams and each having a digital combiner for successively combining the at least one data stream encoded therein with a preceding encoded output signal having cumulative encoded data provided by a preceding one of said channel units in the series, wherein each channel unit produces an associated encoded output signal; and,
    at least one of said channel units capable of providing said associated encoded output signal as a direct output signal to a first subsequent one of said channel units, and of providing a bypass output signal having cumulative encoded data to a further subsequent one of said channel units in order to by pass said first subsequent channel unit.

2. The apparatus according to claim 1, wherein each data stream encoded within an associated channel unit is delayed therein by a programmable delay selected in dependence upon a relative series chain position of the associated channel unit with respect to other of said channel units, such that said encoded data streams are successively combined in successive channel units in time synchronism, whereby a last channel unit in said series chain produces a composite encoded output signal having synchronized encoded data of all said data streams applied to said apparatus.

3. The apparatus according to claim 2, wherein said bypass output signal of said at least one channel unit comprises substantially said direct output signal of said at least one channel unit delayed by a predetermined delay corresponding to a delay incurred by cumulative encoded input data through any of said channel units, whereby cumulative encoded data within said bypass signal is combined within said further subsequent channel unit in time synchronism with data encoded by said further subsequent channel unit.

4. The apparatus according to claim 2, wherein each said channel unit includes at least one chip encoder for encoding the at least one data stream applied thereto to produce at least one encoded data stream that is combined within the associated digital combiner with the preceding encoded output signal, each said chip encoder being programmed to delay the at least one data stream by the associated programmable delay of the channel unit comprising that chip encoder.

5. The apparatus according to claim 4, wherein each of said at least one channel unit further includes:
    a delay circuit coupled to said digital combiner in a bypass path for delaying, by said predetermined delay, a digital combiner output signal produced by said digital combiner that results from the combination of the at least one data stream encoded by the associated channel unit and the preceding encoded output signal.

6. The apparatus according to claim 1, wherein at least a selected one of said channel units is operable to detect defects in encoded data supplied thereto from said preceding channel unit and to provide a control signal to said preceding channel trait to suspend said preceding encoded output signal supplied thereby when said defects are detected.

7. The apparatus according to claim 6, wherein said selected channel unit is further operative to provide said control signal to a prior one of said channel units in the series to cause an associated bypass output signal to be outputted thereby, said associated bypass output signal being supplied to said selected channel unit in place of said preceding encoded output signal, whereby said preceding channel unit is bypassed.

8. The apparatus according to claim 1, wherein each of said at least one channel unit is further operable to provide said bypass output signal to said further subsequent channel unit when said first subsequent channel unit is malfunctioning or electrically disconnected from said apparatus.

9. The apparatus according to claim 5, wherein each of said at least one channel unit further comprises:
    a bypass buffer coupled to said delay circuit for providing said bypass output signal responsive to a buffer control signal provided by said further subsequent channel unit;
    a direct buffer coupled to said digital combiner for providing said direct output signal responsive to another control signal provided by said first subsequent channel unit;
    a detection circuit for sampling said preceding encoded output signal provided by said preceding channel unit to detect faulty data therein and providing an output logic signal of a first logic state if a fault is detected and of a second logic state if no faults are detected; and
    a logic control circuit for providing a common control signal responsive to said output logic signal to each of said direct buffer of an adjacent preceding channel unit and to said bypass buffer of a prior channel unit to control passage of data through said buffers, said common control signal causing said bypass output signal of said prior channel unit to be provided to said at least one channel unit and said preceding output signal of said preceding channel unit to be suspended when a fault is detected.

10. The apparatus according to claim 9, wherein said adjacent preceding channel unit includes a source of ground potential that is operatively coupled to said logic control circuit during normal operation and uncoupled from said logic control circuit when said adjacent preceding channel unit is physically removed from said apparatus, said logic control circuit being responsive to said uncoupling of said source of ground potential to cause said bypass signal of said prior channel unit to be outputted, whereby said adjacent preceding channel unit is bypassed.

11. The apparatus according to claim 10, wherein said digital combiner, said delay circuit and said detection circuit are incorporated within a field programmable gate array.

12. A method for encoding a plurality of data streams in a code division multiple access format to produce a composite output signal, comprising:

providing a series chain of channel units each having at least one chip encoder and a digital combiner;

applying at least one of said data streams to each of said channel units;

encoding the at least one data stream applied to each said channel unit with the at least one associated chip encoder therein;

combining the at least one data stream encoded within each said channel unit with a preceding encoded output signal having cumulative encoded data produced by a preceding channel unit in the series chain; and producing, by at least a selected one of said channel units, an associated one of said encoded output signals as a direct output signal that is selectively provided to a first subsequent one of said channel units, said selected channel unit further producing a bypass output signal having cumulative encoded data that is applied to a further subsequent channel unit in order to bypass said first subsequent channel unit.

13. The method according to claim 12, further comprising delaying said bypass output signal to enable synchronization of said bypass output signal with data encoded within said further subsequent channel unit.

14. The method according to claim 12, further comprising detecting, by each said channel unit, faulty data within said preceding encoded output signal, and providing a common control signal to said preceding channel unit and to a prior channel unit causing said preceding encoded output signal to be suspended and a bypass output signal to be outputted by the prior channel unit when faulty data is detected.

15. Base station transmitter circuitry for use in a wireless telecommunication system, comprising:

a controller for receiving a plurality of input information-bearing signals of separate communication sessions from a telephone network and generating therefrom a plurality of data streams, each corresponding to one of said input signals;

a series chain of code division multiple access channel units, each for encoding at least one of said plurality of data streams and each having a digital combiner for successively combining the at least one data stream encoded therein with a preceding encoded output signal having cumulative encoded data provided by a preceding one of said channel units in said series chain, wherein each channel unit produces an associated encoded output signal; and, at least one of said channel units capable of providing said associated encoded output signal as a direct output signal to a first subsequent one of said channel units, and of providing a bypass output signal having cumulative encoded data to a further subsequent one of said channel units to bypass said first subsequent channel unit.

16. Base station transmitter circuitry according to claim 15, wherein a last one of said channel units in said series chain is operative to provide a composite encoded output signal having encoded data of each of said plurality of data streams, and further comprising in combination therewith an analog conversion trait (ACU) coupled to said last channel unit and operative to convert said composite encoded output signal to analog form for subsequent wireless transmission.

17. Base station transmitter circuitry according to claim 16, wherein said ACU includes a logic control circuit for providing a common control signal to said last channel unit and to a second to last channel unit in the series chain, causing said composite encoded output signal of said last channel unit to be suspended and a bypass signal having cumulative data to be outputted by the second to last channel trait and provided to said ACU when said last channel unit is malfunctioning or electrically disconnected from said transmitter circuitry.

18. Base station transmitter circuitry according to claim 15, wherein:

each data stream encoded within an associated channel unit is delayed therein by a programmable delay selected in dependence upon a relative series chain position of the associated channel unit with respect to other of said channel units, such that said encoded data streams are successively combined in successive channel units in time synchronism, and a last channel unit in said series chain producing a composite encoded output signal having synchronized encoded data of all said data streams provided by said controller;

said bypass output signal of said at least one channel unit comprises substantially said direct output signal of said at least one channel unit delayed by a predetermined delay corresponding to a delay incurred by cumulative encoded input data through any of said channel units, said bypass signal being combined within said further subsequent channel unit in time synchronism with data encoded by said further subsequent channel unit; and said controller providing clock pulses to each said channel unit to facilitate synchronization of said encoded data streams.

19. Base station transmitter circuitry according to claim 15, wherein at least one given one of said channel units is operable to detect defects in encoded data supplied thereto from said preceding channel unit and to provide a common control signal to said preceding channel unit and to a prior channel unit so that when defects are detected, said common control signal causes said preceding encoded output signal supplied by said preceding channel unit to be suspended and a bypass output signal to be outputted by said prior channel unit, said bypass output signal being supplied to said given channel unit, whereby said preceding channel unit is bypassed.

20. The apparatus according to claim 19, wherein said given channel unit is further operative to provide said control signal to suspend said preceding encoded output signal responsive to a command received by said given channel unit from said controller.

21. An apparatus for encoding a plurality of data streams in a code division multiple access format, comprising:

a plurality of channel units coupled in series, each for encoding at least one of said plurality of data streams and each having a digital combiner for successively combining the at least one data stream encoded therein with a preceding encoded output signal having cumulative encoded data provided by a preceding one of said channel units in the series, wherein each channel unit produces an associated encoded output signal;

at least a selected one of said channel units providing said associated encoded output signal as a direct output signal that is provided to a first subsequent one of said channel units, and further providing a bypass output signal that is provided to a further subsequent one of said channel units, said bypass output signal being substantially equivalent to said direct output signal delayed by a predetermined delay; and said further subsequent channel unit operable to combine data encoded therein with encoded data of either said bypass output signal from said selected channel unit or the associated encoded output signal from said first subsequent channel unit.

22. The apparatus according to claim 21, wherein said further subsequent channel unit further includes:

a detector for detecting defects in encoded data within said encoded output signal from said first subsequent channel unit and for providing a predetermined logic level output when defects are detected; and a switch for receiving each of said encoded output signal from said adjacent subsequent channel unit and said bypass output signal from said selected channel unit, said switch being responsive to said logic level output to provide a switch output signal to the associated digital combiner as either said bypass output signal when defects are detected or said encoded output signal from said subsequent adjacent channel unit when no defects are detected.

23. The apparatus according to claim 22, wherein said detector is operative to detect defects in encoded data by detecting parity bit errors in said encoded data.

24. The apparatus according to claim 6, wherein said selected one of said channel units is operative to detect defects in encoded data from said preceding channel unit by detecting parity bit errors within the encoded data.

* * * * *